TELEPHONE SIGNAL REPORTING SYSTEM

Filed Dec. 22, 1961 7 Sheets-Sheet 1

INVENTORS R. C. AVERY
A. MAJLINGER
BY E J Olinder
ATTORNEY

TELEPHONE SIGNAL REPORTING SYSTEM

Filed Dec. 22, 1961 7 Sheets-Sheet 2

INVENTORS R. C. AVERY
A. MAJLINGER
BY E. J. Olinder
ATTORNEY

TELEPHONE SIGNAL REPORTING SYSTEM

Filed Dec. 22, 1961

INVENTORS R. C. AVERY
A. MAJLINGER
BY E J Oluider
ATTORNEY

TELEPHONE SIGNAL REPORTING SYSTEM

Filed Dec. 22, 1961 7 Sheets-Sheet 4

INVENTORS R. C. AVERY
A. MAJLINGER
BY E. J. Blunder
ATTORNEY

Jan. 17, 1967 R. C. AVERY ET AL 3,299,211

TELEPHONE SIGNAL REPORTING SYSTEM

Filed Dec. 22, 1961 7 Sheets-Sheet 5

INVENTORS R. C. AVERY
A. MAJLINGER

BY E J Olwider

ATTORNEY

INVENTORS R. C. AVERY
A. MAJLINGER
BY E J Oluider
ATTORNEY

TELEPHONE SIGNAL REPORTING SYSTEM

INVENTORS R. C. AVERY
A. MAJLINGER
BY E. J. Kluider
ATTORNEY

United States Patent Office 3,299,211

Patented Jan. 17, 1967

3,299,211

TELEPHONE SIGNAL REPORTING SYSTEM

Robert C. Avery, Jackson Heights, and Anthony Majlinger, Long Island City, N.Y., assignors to Bell Telephone Laboratories, Incorporated, New York N.Y., a corporation of New York Filed Dec. 22, 1961, Ser. No. 161,650

14 Claims. (Cl. 179—5)

This invention relates to signal reporting systems and more particularly to alarm reporting systems employing telephone lines. Its principal object is to facilitate the automatic transmission of signals indicative of the existence of a preselected condition or conditions without resort to complex or costly equipment.

Various systems in the prior art have been designed to provide a means whereby signals evidencing a preselected condition may be applied automatically to a telephone subscriber's loop. For example, burglar and fire alarm systems have been proposed wherein a suitably activated switch is employed to intiate the automatic dialing of a preselected number. Conventional central office equipment is then employed to process the received dial pulses in order to direct various information signals to a central location such as a fire station or police station. Despite the obvious advantages inherent in such automatic signaling arrangements, none has yet been adopted for general use, even though the technical feasibility of the required circuitry has long been realized.

Reasons for the lack of commercial use of systems of the types described include the necessity for relatively complex equipment which renders the service economically unattractive. Additionally, prior art proposals lack flexibility and generally may be adapted to only a particular type of telephone signaling system, such as a dial pulse system, for example. Further, known systems are limited to a single type of alarm or information reporting service and cannot readily be adapted to provide multiple reporting services. Also inherent in the circuitry of the prior art is a lack of speed which tends to limit the efficient use of common equipment.

Accordingly, a specific object of the invention is to enhance the flexibility of automatic signal reporting systems so as to render them readily adaptable to various types of telephone plant equipment.

A further object of the invention is to increase the types of automatic signal reporting that can be accomplished by a single system.

Another object of the invention is to increase the speed of automatic signal reporting systems.

These and other objects are achieved in accordance with the principles of the invention by a signal reporting system employing one or more oscillators at a telephone subscriber's premises for sending distinctive signals to a control point via a central office. Each of the oscillators at the subscriber's premises applies a distinctive signal to the subscriber's loop in response to a respective preselected condition. The condition may for example be the existence of a fire in which case a heat-responsive switch is employed to initiate the operation of the oscillator. Various other conditions such as a forced entry, a vending machine requiring replenishment, or the reading of a utility meter may be employed within the principles of the invention to initiate the operation of other signal generating oscillators.

Further in accordance with the principles of the invention, a unique combination of common equipment including diode steering circuits and relays is employed to translate each distinctive subscriber tone into a multidigit code indicative of the origin and of the type of the signal, which code is expressed in terms of a unique combination of multivalued voltages. In accordance with the invention the voltage coded signal thus developed is applies on a space division basis to a particular control point, corresponding to the type of service called for, where suitably responsive means are provided to register the identity of the originating call. Additionally, circuitry at the control point, responsive to the registering means is designed to terminate the operation of the signal generator at the subscriber's station.

Although the invention is described herein in terms of an illustrative embodiment adapated for employment in a particular telephone system, it is a significant feature of the invention that it is uniformly applicable to a telephone system employing any known type of local office. Indeed the flexibility of the principles of the invention renders systems constructed in accordance therewith readily adaptable to communication systems other than telephone systems. Specifically, conductors other than telephone line conductors may be employed and the identifying and translating equipment may be located at points other than in telephone buildings inasmuch as the operation of the system is completely independent of telephone central office switching equipment.

A further feature of the invention is a relay preference circuit whereby two or more simultaneous signals originating in a plurality of lines providing automatic signal service may be reported successively.

Another feature of the invention is an automatic signal reporting system employing a single distinctive tone signal indicative of a preselected condition in combination with means for translating the signal in terms of a unique combination of selectively controlled multivalued voltages applied on a space division basis for further transmission and ultimate recognition.

Still another feature of the invention is an automatic signal reporting system wherein a plurality of condition responsive signals may be generated simultaneously at a single location and applied successively to common transmission equipment in combination with apparatus for automatically terminating each signal in succession after its receipt and registration at a distant point.

These and additional objects and features of the invention will be fully apprehended by reference to the following detailed description of an illustrative embodiment of the invention and by reference to the appended drawing in which:

FIG. 1 is a schematic circuit diagram of the equipment located at the customer's premises in a signal reporting system in accordance with the invention and a schematic circuit diagram of the preference connector;

FIGS. 2 and 3 together present a schematic circuit diagram of the line preference circuit;

FIGS. 4 and 6 together present schematic circuit diagrams of the line encoding and transmission equipment, the control point trunk equipment and the line code conector and register circuits;

Figure 7:
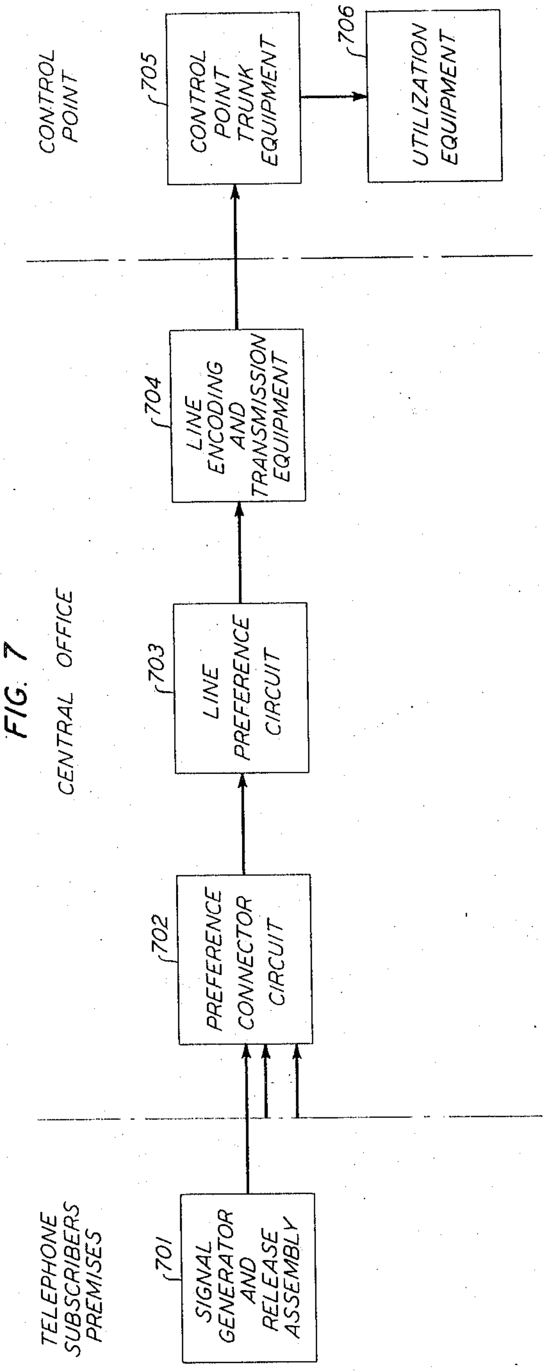
FIG. 7 is a block diagram of the equipment shown in the schematic circuit diagrams of FIGS. 1 through 6.
Figure 8:
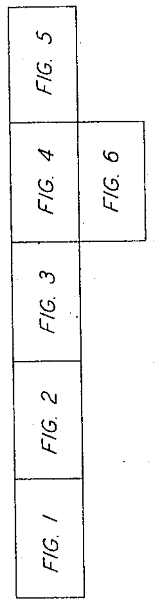
FIG. 8 is a block diagram showing the relative orientation among FIGS. 1 through 6.

In the illustrative embodiment shown in block form in FIG. 7, the equipment block designated signal generator and release assembly 701 is intended to represent apparatus which may be located, in accordance with the invention, at a telephone subscriber's premises. Specifically, this equipment may include one or more oscillators, each operatively responsive to a respective preselected condition. Additionally, there are means for applying a signal in a preferred order from each of the oscillators to the subscriber's loop together with means for terminating the signal generation after the signal generation after the signal has been processed at the receiving end.

The preference connector circuit 702 may be located at the telephone central office or at any convenient centralized location. The function of this equipment is to provide a means for associating a subscriber's line with the reporting system proper. The line preference circuit 703, also located advantageously at the central office, provides selective means for detecting the distinctive oscillatory signal associated with each respective one of the services provided, which may for example include a fire alarm service, a burglar alarm service and a vending machine order service. Relay preference chains are provided to establish an order of priority among simultaneous or overlapping signals and additional relays, operatively associated with detector outputs establish unique combinations of signaling paths associated with the identity of the signaling station.

The line encoding and transmission equipment 704, also located at the central office, converts the information received to a unique combination of D.-C. voltages in accordance with a preselected code which combination is indicative of the identity of the transmitting station. Each of the D.-C. voltages is applied to a respective one of the conductors of a multiconductor cable which ties the line encoding and transmission equipment 704 to unique terminating equipment, designated control point trunk equipment 705, which is located at the control point. Such application of each of a number of signals or voltages to a respective one of a plurality of individual and separate leads or terminals is commonly termed a "space division" process or application of these signals or voltages. As indicated above, the control point may be located at a fire or police station or other centralized point at which the identity informaiton may be suitably registered. Equipment at the control point is common to all associated incoming trunks from the various buildings which it serves. The control point trunk equipment 705 operates to apply each of the voltages in each signal combination to operate a respective unique relay out of a respective one of three groups of 10 relays. In this fashion, any one of 1000 stations may be readily identified. By means of additional trunks and trunk preference circuits, the system may be multiplied to accommodate additional groups of 1000 stations or less.

Figure 3:
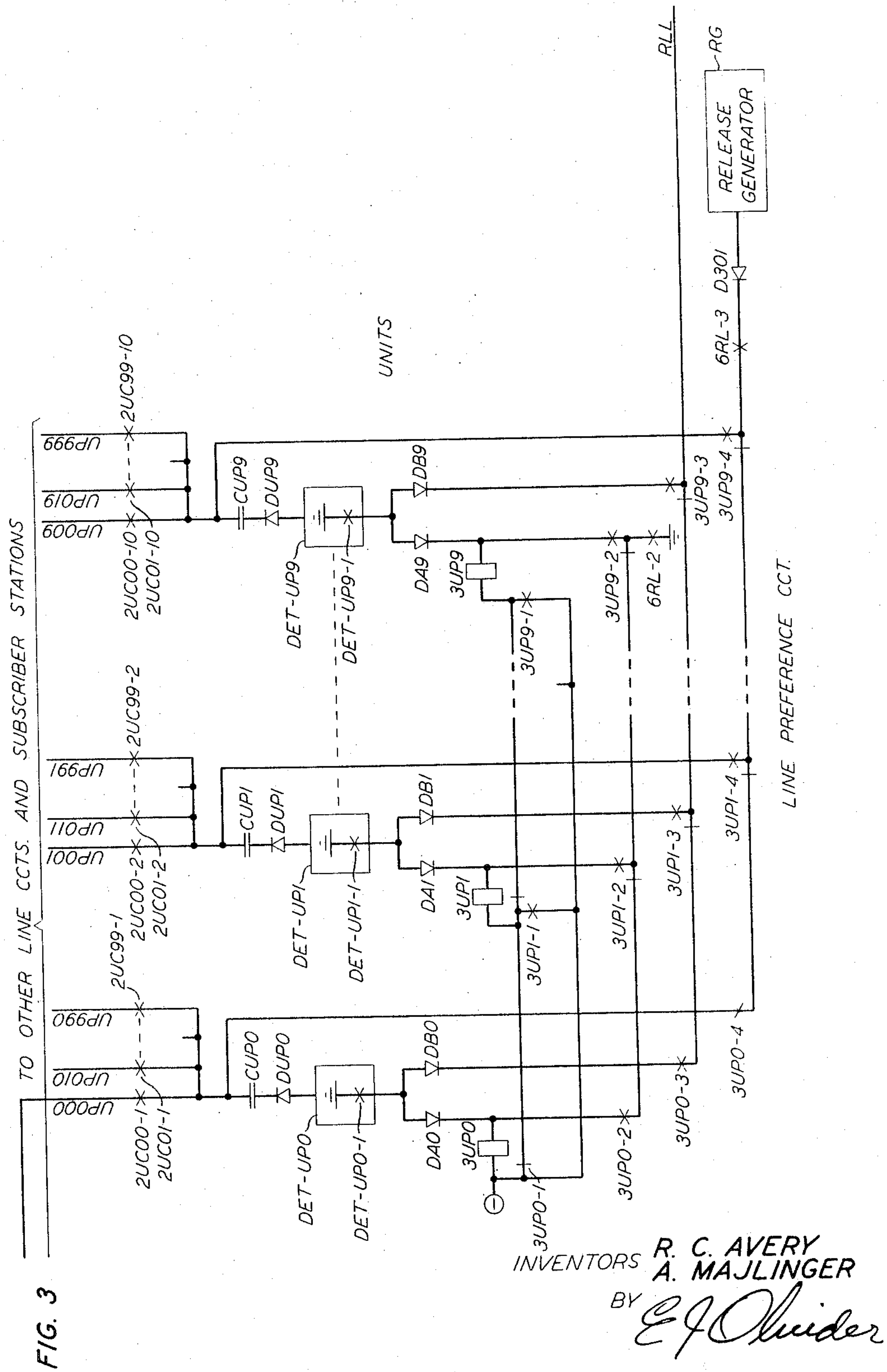
Figure 4:
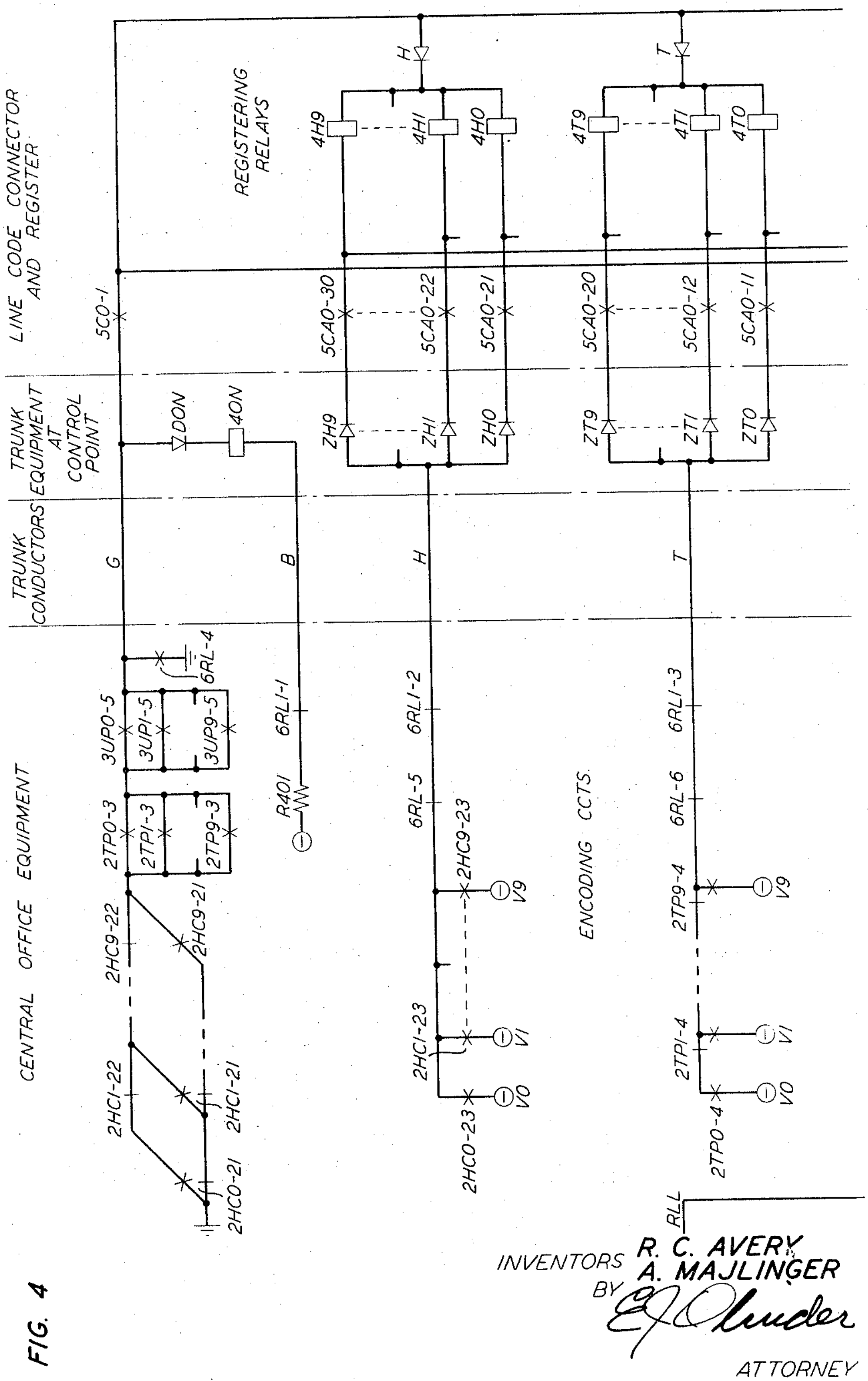

Registering equipment 706 may comprise a suitable printer or other recording means which may be actuated as indicated in the more detailed descriptions that follow. Throughout the schematic circuit diagrams shown in FIGS. 1 through 6, conventional detached contact notation has been employed with the symbol (X) indicative of a make contact and the symbol (—) indicative of a "normal" or break contact. The contact symbols shown in the drawing correspond to contact conditions when the corresponding relays are actuated. The contact designating convention employed serves to identify each contact with its corresponding relay and also indicates the drawing sheet on which the relay winding is shown. Thus, for example, make contact 2TP0–4, shown in the lower left corner of FIG. 4, is operated by relay 2TP0 which is shown, as indicated by the prefix 2, in FIG. 2.

*Alarm signal*

Figure 1:
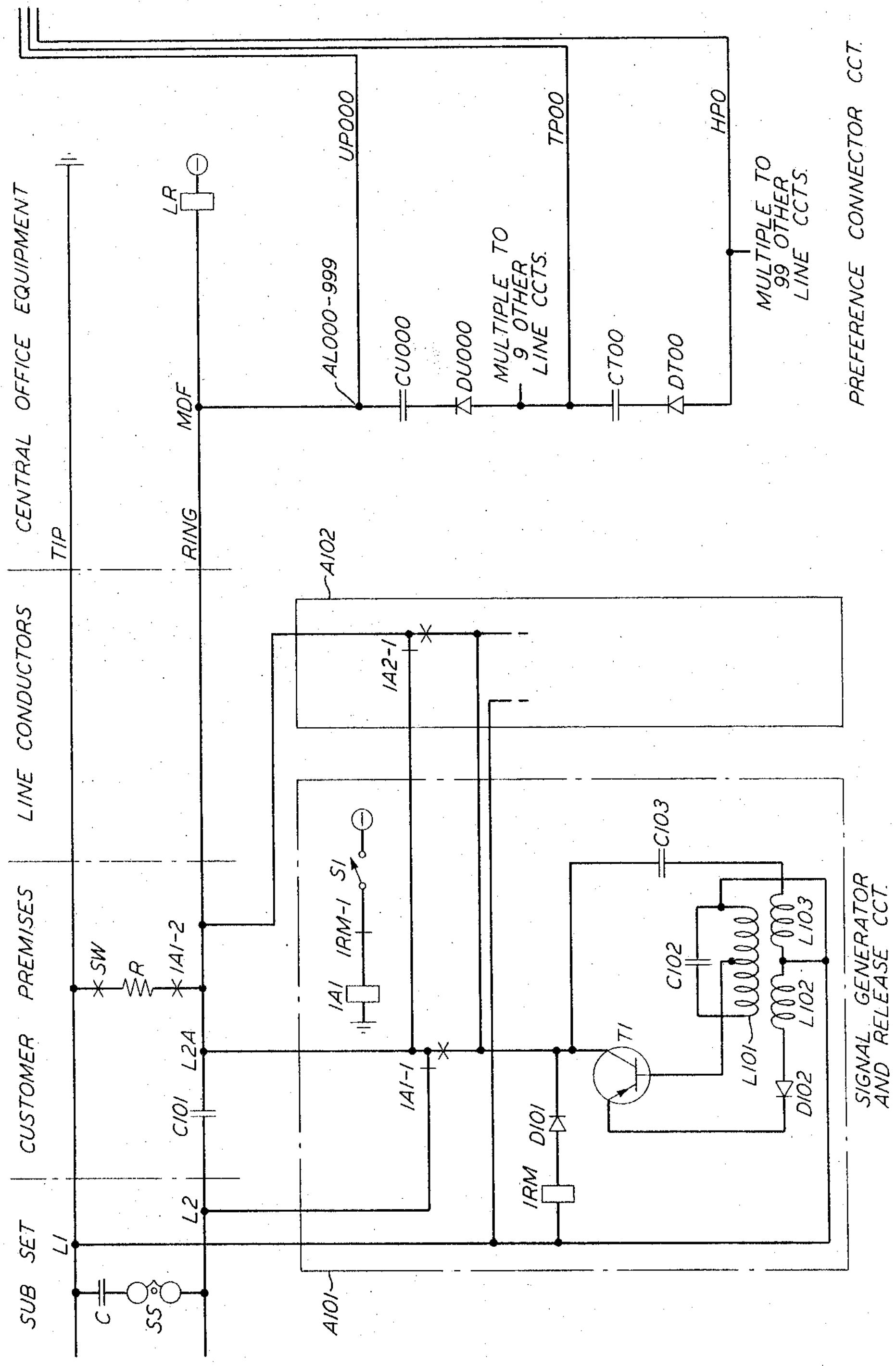

With reference now to FIG. 1, a signal generator and release circuit is shown in the broken line box A101. A similar circuit is indicated by the box A102. That circuit is not shown in detail inasmuch as the sole distinction between it and circuit A101 lies in the frequency of the oscillator.

The transmission of an alarm signal is initiated by closing switch S1. For police alarm service switch S1 is ordinarily operated by manual means, as shown, upon the occurrence of an emergency. For such use the switch may be concealed under a desk or in a cash register, for example, to permit undetected operation. However, switch S1 may also be operated automatically, by means not shown, upon the opening of a normally closed circuit resulting from a forced entry into the premises or other like condition. For fire alarm service switch S1 would be prominently displayed. In such application also it would be operated manually, or by automatic means controlled by a thermostat or other suitable device. Alternatively, switch S1 may be automatically operated upon completion of each full cycle of a utility meter such as a gas or electric meter. Similarly, the switch may readily be adapted for automatic operation initiated by a suitable refill signal from a vending machine.

The closure of switch S1 completes a circuit from ground through the winding of relay 1A1 and break contact 1RM–1 to battery, thus operating relay 1A1. Relay 1A1, when operated, locks mechanically by means not shown, under control of relay 1RM, and connects battery from the ring lead of the line through the alarm generator to ground on the tip lead. This path may be traced from junction point L2A through make contact 1A1–1, through the collector to base junction of transistor T1, through coil L101, and thence to ground by way of junction point L1 on the tip lead. The signal generator includes transistor T1 and a tuned circuit consisting of capacitor C102 and coil L101. Collector-to-base coupling is provided by capacitor C103 and inductive coils L102 and L103. Diode D102 isolates the emitter and base biasing circuits of transistor T1. Completion of the path described causes the signal generator to oscillate in conventional fashion, thereby applying a distinctive frequency corresponding to the type of service desired to the ring lead. Relay 1RM does not operate at this time owing to the presence of diode D101 in its circuit. Diode D101 is a bidirectional Zener diode which blocks both lobes of the frequency produced by the alarm generator. However, diode D101 will conduct the oscillatory signal of substantially greater magnitude which is connected upon completion of a call, as hereinafter described, in order to operate relay 1RM and thereby to release relay 1A1 at that time.

In accordance with the invention, the circuit shown in FIG. 1 is operative whether or not the associated subset SS is in use. Moreover, the operations described which are incident to the generation and transmission of an alarm signal do not break down an established talking connection. Specifically, if relay 1A1 is operated while a conversation is taking place, the ring lead is disconnected from the subset by the opening of break contact 1A1–1. Make contact 1A1–2 completes a holding bridge across the line conductors, however, through resistor R and make contact SW, an added switchhook contact, thus preventing false release of the connection.

Under the conditions described, a small amount of current from the signal generator shown in box A101 is diverted through capacitor C101 to subset SS as a signal to the subscriber that an alarm request is in progress. Consequently, the subscriber will not disconnect under the false impression that a cutoff has occurred.

As noted above, relay 1A1 is arranged to lock mechanically under control of release relay 1RM. The purpose of this arrangement is to ensure connection of the alarm signal until the call is completed, regardless of traffic delays or possible open intervals with respect to the battery on the ring lead. Battery is required for the operation of the alarm generator as described. If the line is idle, battery is provided through the winding of the line relay LR as shown. Under normal battery open interval conditions, however, battery may be applied from a sender or a transmission bridge while the line is in use. Battery open intervals typically occur while a telephone call is being set up, and when it is released. For example, in setting up a call the line relay battery is removed from the ring lead for a period of several milliseconds and upon the termination of such period it is replaced by battery from a sender or register. Similar conditions obtain just prior to the establishment of a talking path. The occurrence of any such open interval, while an alarm signal transmitting path is being established necessarily disables the alarm generator and consequently, all equipment which has been operated therefrom is released. Upon reclosure of the battery, which again enables the generator, the call restarts however, and proceeds to completion as described hereinbelow.

*Identification of calling line*

As shown in FIG. 1, at the central office a cross-connection is made from the ring lead at the main distributing frame junction point MDF to one of a group one thousand terminals designated AL000–999 in the equipment group corresponding to the type of service desired. An equipment group, which includes a preference connector circuit and a line preference circuit, is provided per 1000 or less lines per type of service. Each group is arranged to respond only to the frequency assigned to the type of service which it represents. A line may be associated with two or more types of services by connecting its ring lead to an AL terminal in an equipment group for each such type. Each AL terminal is wired individually to a corresponding units preference lead, one of which UP000 is shown, and through a U capacitor such as CU000, and a diode such as DU000 to a tens preference lead such as TP00, and further through a T capacitor such as CT00 and a diode such as DT00 to a hundreds preference lead such as HP0. With the strapping arrangements shown, a signal connected to an AL terminal therefore appears on an HP lead such as HP0, representing the hundreds block which contains the terminal number, on a TP lead such as TP00, representing the tens block which also contains it and on an individual UP lead such as UP000 which corresponds to the terminal number. The numerical designation of the HP, TP, and UP leads activated on a call correspond, respectively, to the first digit, the first two digits, and the three digits of the AL terminal number used.

The diodes DU000 and DT00 are provided to prevent back-ups to unwanted leads. They also convert the signal to a negative half-wave. Capacitors CU000 and CT00 prevent the HP and TP detectors shown in FIG. 2 from affecting the line relay circuit.

Figure 2:
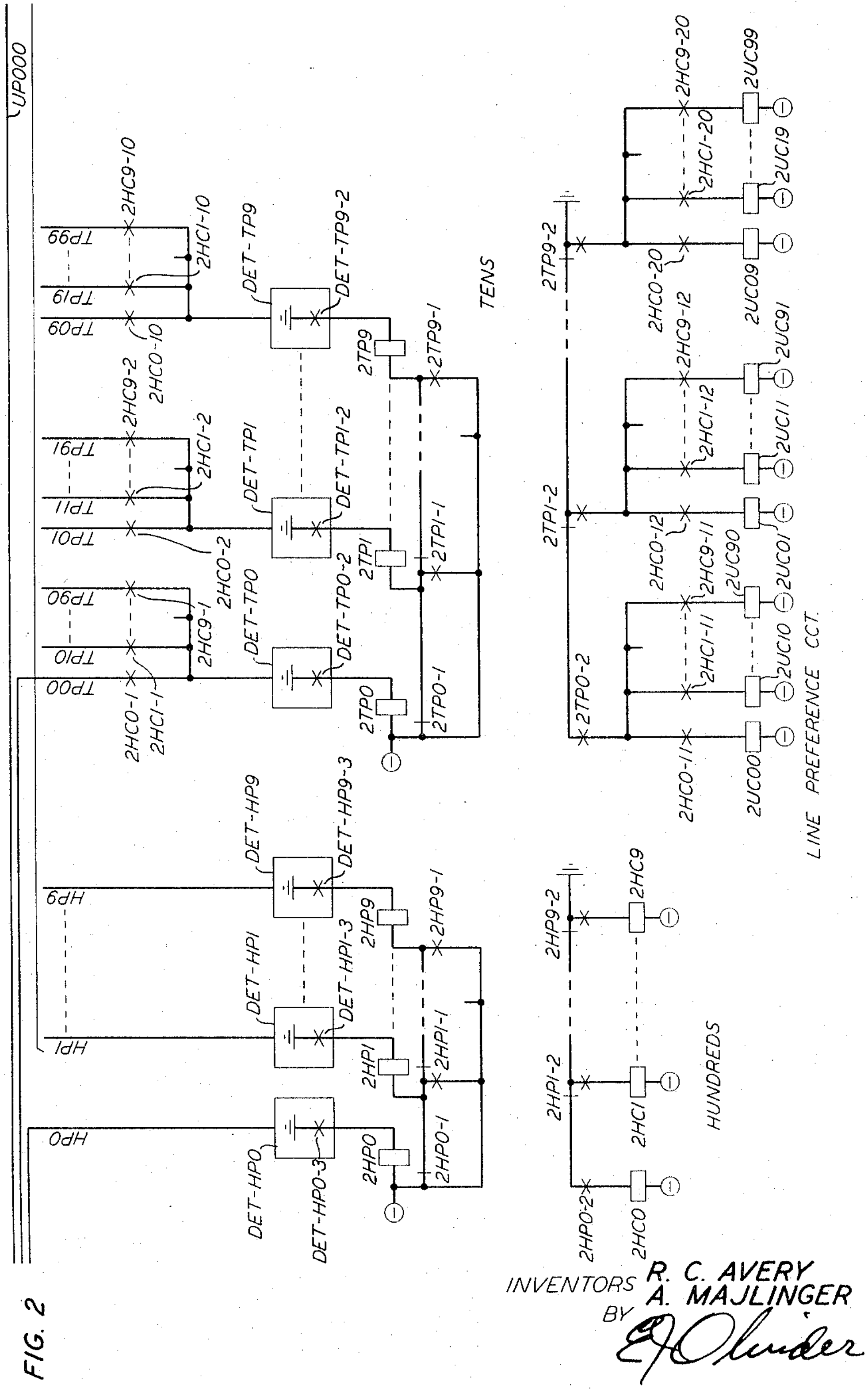

With reference now to FIG. 2, the connection of a signal to a lead such as HP0 causes operation of the corresponding detector DET–HP0, relay 2HP0 and relay 2HC0. The operating paths for relays 2HP0 through 2HP9 and 2HC0 through 2HC9, and the locking paths for relays 2HP1 through 2HP9 are obvious. It is also evident, by virtue of the location of the break contacts such as 2HP1–2 that only a single relay in the group 2HC0, 2HC1, . . . 2HC9 may be operated at any given time, even though two or more of relays 2HP0 . . . 2HP9 may be operated. This conventional preference arrangement is employed to preclude the possibility of erroneous identification which might occur in the case of overlapping or simultaneous calls in different hundreds blocks, such blocks being indicated by leads HP1 through HP9 and their associated detectors and relays.

The 2HC relay, such as 2HC0, which operates, represents the hundreds block in which the calling line, or a preferred calling line appears. The operation of a 2HC relay such as 2HC0 connects the TP lead such as TP00 which is associated therewith to the corresponding TP detector, in this instance, detector DET–TP0, through make contact 2HC0–1. The output from detector DET–TP0 operates relay 2TP0 and as a result relay 2UC00 operates over a path from ground through normal contacts 2TP9–2 and 2TP1–2 (and through intervening normal contacts not shown), make contact 2TP0–2, make contact 2HC0–11, and the winding of relay 2UC00 to battery.

As shown, the 2UC relays are provided on the basis of one per ten AL terminals. Thus, relay 2UC00 is associated with AL terminals and UP leads 000–009, and relay 2UC01 with terminals and leads 010–019. Similarly, relays 2UC09 through 2UC99 are associated with correspondingly designated leads and terminals. The 2UC relay selected, such as relay 2UC00, includes the UP lead for the calling line, as it corresponds to the tens block lead TP which is activated for the call. The preference circuit shown, which includes break contacts 2TP1–2 through 2TP9–2, permits the operation of a preferred 2UC relay only, in the case of simultaneous calls in different tens blocks of the same hundreds block.

The operation of relay 2UC00 connects the associated lead UP000 to the corresponding detector DET–UP0 by way of make contact 2UC00–1, capacitor CUP0 and diode DUP0. This connection serves to identify the calling line of the possible ten which it represents. Diode DUP0 converts the signal received to a negative half wave which is similar to the inputs of the HT and TP detectors. Capacitor CUP0 is provided to prevent the UP detectors from affecting the line relay circuit. This conversion permits uniform manufacture of the detectors for the three identification stages. The output of detector DET–UP0 is applied by way of diode DA0 to operate relay 3UP0.

At this point in the sequence of operations, the calling line, or a preferred calling line in the case of simultaneous calls, has been identified in terms of its arbitrary three digit number which corresponds to the AL terminal to which it is connected. This is evidenced by the operation of a 2HC relay corresponding to the hundreds digits of this number, a 2TP relay representing the tens digit, and a 3UP relay representing the units digits. In the case of simultaneous calls, two or more 2TP relays or two or more 3UP relays may be operated. In each such case, however, only the preferred relay is effective for transmitting information to the control point, as hereinafter described.

The detectors provided for a given service respond only to the frequency assigned thereto. Consequently, on calls for a given service from multiservice lines, no interference is caused in any other equipment groups. The assigned frequencies are also advantageously selected in accordance with the invention to be sufficiently different from those used for key set dialing to ensure rejection of key set dialing frequencies by the detectors.

*Transmission of information to control point*

Figure 6:
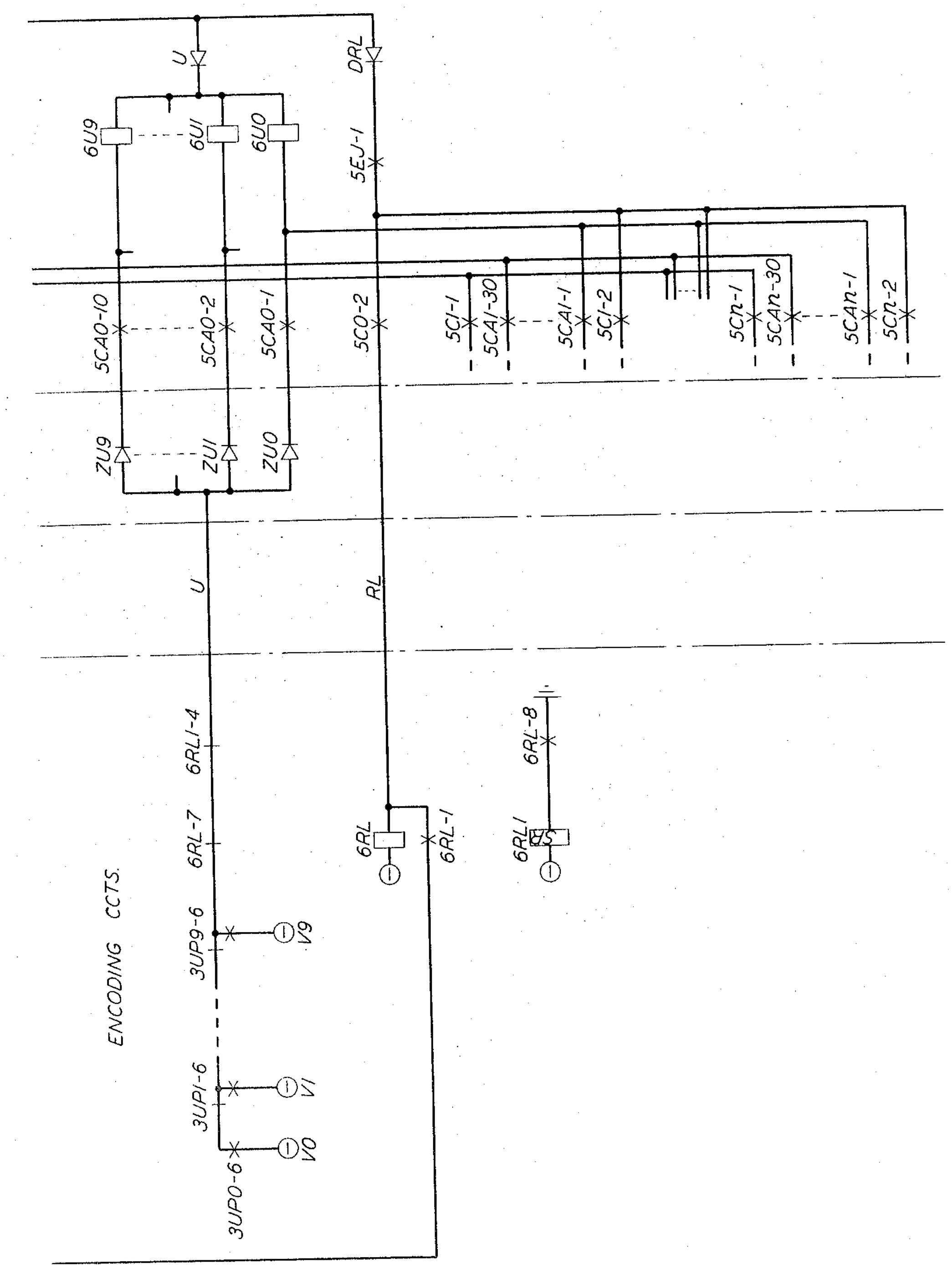

In FIGS. 4 and 6 equipment shown under the label "Central Office Equipment" provides a means for transmitting the line identity information or line code, derived as described above, to the control point by way of a six conductor trunk which includes the leads G, B, H, T, U, and RL. One such trunk and associated equipment is provided for each equipment group. Upon operation of a 2HC relay, a 2TP relay and a 3UP relay, as described above, a path is closed to operate relay 40N. This path may be traced from battery through reseistor R401, break contact 6RL1–1, the winding of relay 40N, diode D0N, trunk conductor G, make contact 3UP0–5, make contact 2TP0–3, break contacts 2HC9–22 through 2HC1–22, make contact 2HC0–21, and thence to ground. It is evident that the operating path described for relay 40N is illustrative and is necessarily dependent upon the particular 2HC, 2TP, and 3UP relays that have operated.

Figure 5:
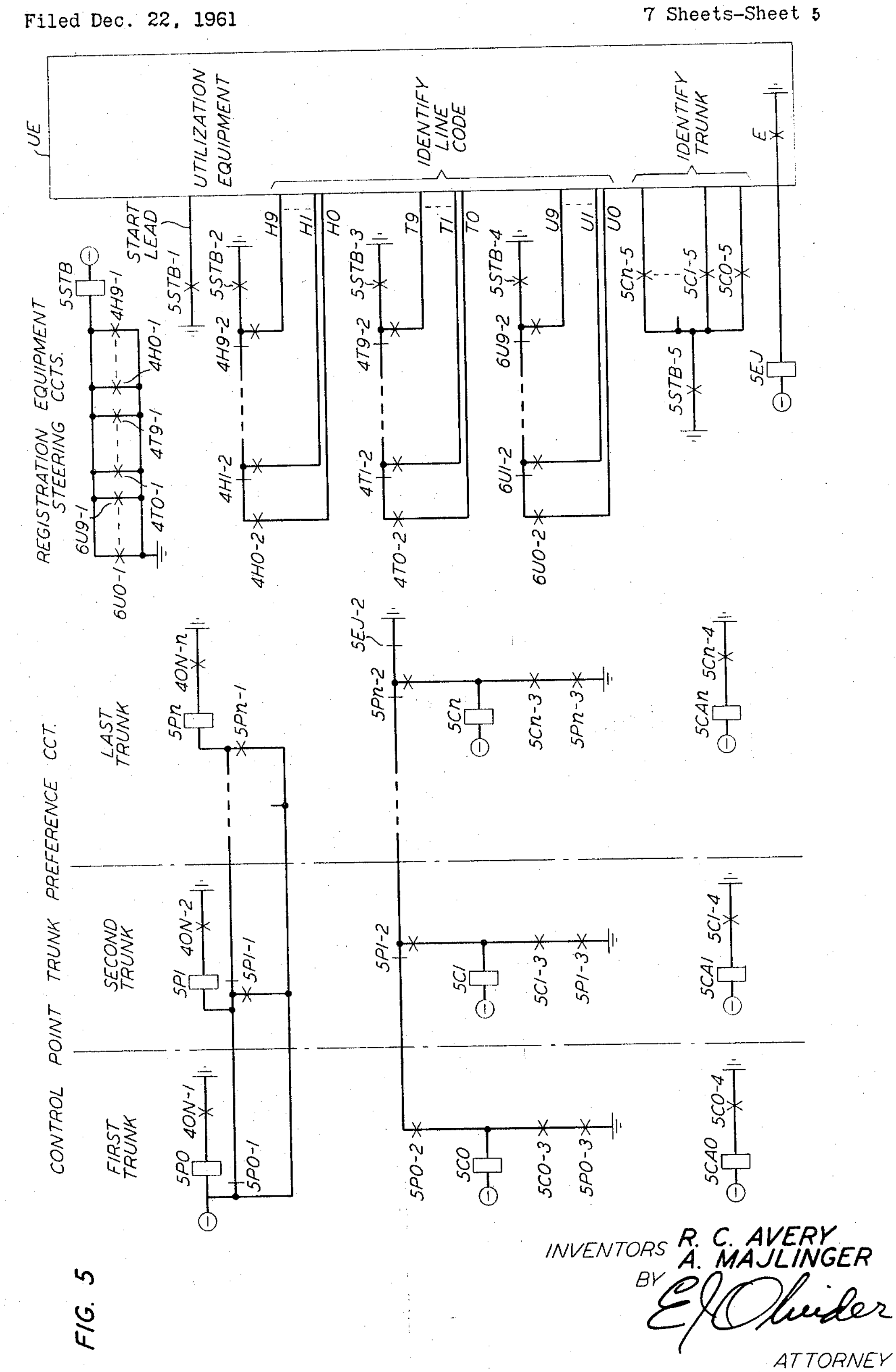
FIG. 5 is a schematic circuit diagram of the control point trunk preference circuit and of the registration equipment steering circuits.

As shown in FIG. 5, the operation of relay 40N causes its associated 5P relay, 5C relay and 5CA relay to operate. Thus, for example, in the case of a first trunk, relay 5P0 is operated through the closure of contacts 40N–1, relay 50 is operated through the closure of contact 5P0–2 and relay 5CA0 is operated through the closure of contact 5C0–4. As indicated, these relays are provided per trunk. The obvious preference arrangements which are included permit only one trunk to be served at a time in case of simultaneous or overlapping calls.

Again with reference to FIGS. 4 and 6, with the appropriate 5C and 5CA relays of the calling trunk operated, paths are closed to transmit the hundreds, tens and units digits of the line code over trunk conductors H, T, and U, respectively, to the trunk equipment at the control point. For each such digit a voltage from the voltage supply groups V0, V1 . . . V9 corresponding to the numerical value of that digit is connected to the associated conductor. In the case of the hundreds digit only one 2HC relay is operated, relay 2HC0, for example, and the corresponding voltage, in this instance voltage V0, is closed through directly by way of make contact 2HC0–23 and normal contacts 6RL–5 and 6RL1–2. For the tens and units digits, however, nonpreferred 2TP and 3UP relays may be operated in addition to the preferred relays and therein chain circuits such as make and break contacts 2TP1–4 through 2TP9–4 are required.

The trunk equipment at the control point includes Zener diodes ZH0 through ZH9, ZT0 through ZT9 and ZU0 through ZU9 for each trunk. Each of these diodes has a voltage breakdown point which corresponds to a respective one of the voltages V0 through V9, less the voltage drop in the conductor of the particular trunk involved. Consequently, upon operation of a 5C and a 5CA relay, as described, a 4H, a 4T, and a 6U relay corresponding to the line number registered operates to ground on conductor G by way of make contact 5C0–1 and by way of a respective one of the diodes H, T, and U, which diodes are provided to prevent backups between batteries of different voltage which operate with a common ground on conductor G. Specifically, for example, relays 6U0, 4T0, and 4H0 may operate. In the event that higher numbered relays are operated instead, as would be the case if the number of the station is other than 000, all lower numbered relays in each of the 6U, 4T and 4H relay groups would operate without effect.

The operating sequence described thus far has provided for the generation of an alarm signal, for the translation of such signal to a line identifying code and for the transmission of the line code from the central office to the control point. The specific utilization of the transmitted code information necessarily depends upon the particular service being furnished. Irrespective of the specific service, however, the principles of the invention call for a means for applying ground to a particular lead in each of three ten-lead groups which serves to identify any station numbered 000 through 999. Service for additional groups of lines of one thousand or less is provided in accordance with the invention by including an "identity trunk" circuit which grounds an appropriate lead identifying the calling trunk by the closure of make contact 5STB–5 and one of the make contacts 5C0–5 through 5C*n*–5.

Utilization equipment UE may comprise any one of a number of registering type equipments such as a punch-card sorter, an automatic printer or a suitably modified teletypewriter receiver. Details of such equipment are not shown inasmuch as their adaption for the purposes indicated is well within the skill of the art. As indicated, the first 4H, 4T, or 6U relay to close its contacts provides an operating path for a starting relay 5STB. A path from ground through make contact 6U0–1 is illustrative. The minimum operate time of this relay is at least equal to the difference between the minimum and maximum operate times of the 4H, 4T and 6U relays. As a result, these relays will have become stabilized by the time relay 5STB operates. Relay 5STB operated applies ground to the utilization equipment UE for starting purposes by way of make contact 5STB–1. Relay 5STB also connects ground to an H lead by way of make contact 5STB–2 and 4H0–2, for example, to a T lead by way of make contact 5STB–3 and make contact 4T0–2, for example, and to a U lead by way of make contact 5STB–4 and make contact 6U0–2, for example. Thus, ground is applied to a lead in each of three groups of ten leads to correspond to the number of the calling station. Additionally, a trunk identity lead is grounded through make contact 5STB–5 and make contact 5 to the operated 5C relay, such as 5C0. As indicated, provision is made for the identification of a total of *n* trunks.

In applying the principles of the invention to the design of a police or fire alarm system, it may be desirable to employ a punched card sorter, as indicated above, as the utilization equipment UE. The sorter may then be arranged to select a particular one of a plurality of previously prepared cards corresponding to the various combinations of identifying information which it may receive. This information may consist of the line identity information and of the arbitrary trunk number which corresponds to the group of one thousand lines involved. These two quantities collectively identify the point of origin of the signal. Advantageously, the cards employed could have printed upon them all information necessary for dispatching assistance to the calling location, such as address, telephone number and the like. For meter reading a record of the calling station and the date and time the signal is received could readily be made.

*Release of circuit*

Upon completion of the function of utilization equipment UE any suitable means may be employed to effect the closure of a make contact E, completing a path for the operation of relay 5EJ. Relay 5EJ completes a path for the operation of relay 6RL, which path may be traced from battery through the winding of relay 6RL to make contact 5C0–2 by way of conductor RL, make contact 5EJ–1, diode DRL, and make contact 5C0–1, to conductor G and thence to ground, which ground has previously been applied to conductor G, as described above.

Relay 6RL locks over lead RLL through the chain contacts of the 3UP relays which, if relay 3UP0 is operated, may be traced through break contacts 3UP9–3 through 3UP1–3, make contact 3UP0–3, diode DB0, and thence to ground in the detector DET–UP0, through make contact DET–UP0–1. Relay 6RL also releases the operated 4H, 4T, and 6U relays shown in FIGS. 4 and 6 by opening their operating paths at break contacts 6RL–5, 6, and 7. Additionally, relay 6RL, in operating, causes relay 6RL1 to operate through make contact 6RL–8. The release of the 4H, 4T, and 6U relays releases relay 5STB which serves to open the start gate and trunk identity leads to utilization equipment UE, thus causing the equipment to return to its normal condition. The operation of relay 6RL1 releases relay 40N by opening its operating circuit at break contact 6RL1–1. The operated combination of 5P, 5C, and 5CA relays is also released by the opening of the corresponding make contact 40N–1 for the trunk used. Simultaneously, release generator RG shown in FIG. 3 is connected through diode D301, make contact 6RL–3, the chain contacts of the 3UP relays, and of the operated 2UC relay to the UP lead such as UP000 involved in the call and consequently to the ring lead of the line. The release generator RG shown in block form, may consist of any suitable oscillating signal source. The signal produced by the release generator RG is of sufficient amplitude to be passed by diode D101 of FIG. 1 and to operate release relay 1RM to ground on the tip lead. Relay 1RM operated releases relay 1A1 by opening break contacts 1RM–1 which in turn releases relay 1RM and disconnects the alarm generator A101 from the line. The operating mechanism of switch S1 may still be enabled at this time. However, the switch is assumed to be of a type which permits release of its contacts upon the operation of relay 1RM, regardless of the position of the means used to actuate these contacts.

Disconnection of the alarm frequency as described releases the detectors shown in FIGS. 2 and 3. Release of the HP detector releases the operated 2HP and 2HC relays and release of the TP detector releases the operated 2TP and 2UC relays. Release of the UP detector releases relay 6RL which in turn releases the operated 3UP relay, which was locked to ground through contact 6RL–2 and disconnects release generator RG from the line.

The circuitry involving the sequential release of relays 6RL and 3UP is provided to ensure the release of relay 6RL in the event that other preference relays are operated at this time as a result of signals on other lines. The release of relay 6RL releases relay 6RL1 by the opening of make contact 6RL–8. Relay 6RL1 is slow in releasing in order to permit stabilization of the preference circuit in a pattern corresponding to a signal on the next preferred line, if other calls are waiting, before reclosing the trunk conductors. The release of relay 6RL1 closes conductors H, T, and U and provides battery to relay 40N so that it may operate for a succeeding call. When utilization equipment UE returns to normal suitable provisions are made for opening make contact E, thus releasing relay 5EJ. The release of relay 5EJ permits the operation of a 5C relay for a succeeding call.

*Signal preference for multiservice lines*

As indicated above, a line arranged for two or more types of service requires a signal generator assembly such as A101 or A102 for each of these services. Simultaneous requests for different services may occur with respect to such a line. For example, a fire alarm signal might be initiated while a meter reading request is being processed. In order to prevent interference in such cases, a preference and lock-out arrangement must be provided at the premises. Such an arrangement may advantageously consist of one relay per type of service, operable in a conventional preference chain, and arranged to control the ring lead connections by means of a chain in the opposite direction. Such an arrangement would ensure the completion of simultaneous or overlapping calls in sequence, without interruption or false release because of other requests.

It is to be understood that the embodiment described herein is merely illustrative of the principles of the invention. Various other arrangements may be employed without departing from the spirit and scope of the invention.

What is claimed is:

1. In an automatic signal reporting system, in combination, a plurality of signal stations, means at each of said stations responsive to a preselected condition for generating respective tone signals, a translating station, transmission means for applying each of said tone signals to said translating station, means at said translating station for converting each one of said tone signals into a respective unique combination of multivalued direct voltages indicative of the identity of the corresponding one of said stations, a control point, transmission means for applying each combination of said voltages on a space division basis to said control point, and means at said control point responsive to said space division voltages for registering the identity of the corresponding one of said stations in terms of a unique code.

2. In an automatic signal reporting system, in combination, a plurality of signal stations, means at each of said stations responsive to a preselected condition for generating respective tone signals, a translating station, transmission means for applying each of said tone signals to said translating station, a plurality of sources of direct voltage at said translating station each producing a respective unique voltage magnitude, means at said translating station responsive to the application of one of said tone signals for converting each one of said tone signals into a respective unique combination of said voltages, a control point, transmission means for applying said last named voltages on a space division basis to said control point, and means at said control point responsive to said space division voltages for registering the identity of the corresponding one of said stations in terms of a unique code.

3. In an automatic signal reporting system, in combination, a plurality of signal stations, means at each of said signal stations responsive to a preselected condition for generating respective single frequency tone signals, a translating station, transmission means for applying each of said tone signals to said translating station by way of a respective communication path, a source of multivalued direct voltages at said translating station, a control point, means at said translating station responsive to a preferred one of said tone signals for applying a corresponding combination of said voltages on a space division basis to said control point, and means at said control point responsive to said space division voltages for registering the identity of the corresponding one of said stations in terms of a unique code.

4. In an automatic signal reporting system, in combination, a plurality of signal stations, means at each of said signal stations responsive to a preselected local condition for generating respective signal-tone signals, a translating station including a source of multivalued direct voltages, transmission means for applying each of said tone signals to said translating station, means at said translating station responsive to one of said tone signals for applying one of said direct voltages to each of a plurality of transmission lines, the particular combination of said direct voltages thereby applied to said transmission lines being indicative of the frequency of the corresponding one of said single tone signals and therefore indicative of the identity of the corresponding one of said signal stations, said lines corresponding in number to the number of digits in a numerical code employed to identify each of said signal stations, the magnitude of each of said applied voltages corresponding to a particular digit in accordance with said code, a control station including a plurality of groups of ten parallel transmission paths, the number of said groups corresponding to the number of said digits, means responsive to one of said voltages on each of said transmission lines for applying each of said last named voltages to a respective one of said transmission paths in a respective one of said groups of paths, and a plurality of registering means each operatively responsive to the application of a voltage on a respective one of said transmission paths, whereby the identity of one of said stations generating one of said tone signals is automatically indicated at said control station by the operation of a corresponding combination of said registering means.

5. In a telephone system an automatic alarm reporting system comprising, in combination, a plurality of subscriber stations, a central office and a control station, means at each of said subscriber stations responsive to a preselected condition for transmitting respective single tone alarm signals to said central office, means at said central office supplying a plurality of multivalued direct voltages, means at said central office responsive to one of said alarm signals for applying each of a distinctive combination of said direct voltages to a respective one of a plurality of transmission lines in conformance with a preselected numerical, multidigit code employed to designate said subscriber stations, a plurality of groups of ten parallel transmission paths at said control station, each of said groups corresponding to a respective one of said transmission lines, means at said control station responsive to the application of said combination of direct voltages to said plurality of transmission lines for applying each of said last named direct voltages to a respective one of said transmission paths in a respective one of said groups of transmission paths, a plurality of electromechanical relays each operatively responsive to the application of a direct voltage to an associated one of said transmission paths, whereby a particular one of said subscriber stations is automatically identified in terms of said numerical multidigit code system by the operation of a unique combination of said relays, whereupon the operation of said last named relays may be further employed to initiate the operation of special purpose registering means.

6. Apparatus in accordance with claim 5 wherein each of said transmission paths in each of said groups includes a diode having a voltage breakdown value corresponding to a respective one of said multivalued voltages.

7. Apparatus in accordance with claim 5 including means operatively responsive to the operation of one of said relays in each of said groups for terminating the operation of the corresponding one of said subscriber station alarm signal transmitting means, thereby readying said system for the reception and identification of an alarm signal from another of said subscriber stations.

8. In a telephone system an automatic alarm reporting system comprising, in combination, a plurality of subscriber stations, a central office and a control station, means at each of said subscriber stations responsive to a preselected condition for transmitting respective single tone alarm signals to said central office, means including a first group of relays each operatively responsive to one of said signals from any one of a respective first group of said subscriber stations, means including a second group of relays each operatively responsive to a respective relay in said first group of relays, means including a third group of relays each jointly operatively responsive to one of said signals from any one of a second group of said subscriber stations and to the operation of a respective one of said relays in said second group, a fourth group of relays each operatively responsive to a corresponding one in said third group of relays, a fifth group of relays each jointly operatively responsive to one of said signals from a respective one of said stations included in said first and second groups of subscriber stations and to the operation of a corresponding one of said relays in said fourth group of relays, said first and second groups of relays being arranged in a first relay preference chain and said third and fourth groups of relays being arranged in a second relay preference chain thereby to preclude the simultaneously operation of more than one meaningful combination of relays from said second, fourth and fifth relay groups in the event of simultaneous or overlapping signals from a plurality of said subscriber stations, a plurality of sources of fixed potential each having a distinctive voltage magnitude with a preassigned unique identifiable relation with a respective one of said relays in each of said second, fourth, and fifth relay groups, a plurality of transmission lines between said central office and said control point, means responsive to the operation of any combination of relays including one relay from each of said second, fourth and fifth relay groups for applying a corresponding unique combination of said potentials to said transmission lines, each of said last named potentials being applied to a respective one of said transmission lines, a plurality of groups of relays located at said control point, a plurality of groups of means including groups of conducting paths for rendering each relay in each of said last named relay groups operatively responsive to the application of a respective one of said potentials to a respective one of said transmission lines, whereby the operation of a combination of one of said relays from each of said last named relay groups may be translated, in accordance with a preselected code, into a digit combination indicative of the originating station.

9. Apparatus in accordance with claim 8 further including means operative after the operation of an identifying group of said registering relays for automatically terminating the generation of the corresponding alarm signal at the originating one of said subscriber stations.

10. Apparatus in accordance with claim 8 wherein said groups of means further include a diode in series relation with each of said conducting paths, each of said diodes having a voltage breakdown value corresponding to a respective one of said potentials.

11. In a telephone system an automatic alarm reporting system comprising, in combination, a plurality of subscriber stations, a central office and a control station, means at each of said subscriber stations responsive to a respective preselected condition for transmitting respective single tone alarm signals to said central office, means including a first group of relays each operatively responsive to one of said signals from any one of a respective first group of said subscriber stations, means including a second group of relays each jointly operatively responsive to one of said signals from any one of a second group of said subscriber stations and to the operation of a respective one of said relays in said first group, means including a third group of relays each jointly operatively responsive to one of said signals from a respective one of said stations included in said first and second group of subscriber stations and to the operation of a corresponding one of said relays in said second group, a plurality of sources of fixed potential each having a distinctive voltage magnitude with a preassigned unique identifiable relation, with a respective one of said relays in each of said first, second and third relay groups, a plurality of transmission lines between said central office and said control point, means responsive to the operation of any combination of relays including one relay from each of said first, second and third relay groups for applying a corresponding unique combination of said potentials to said transmission lines, each of said last named potentials being applied to a respective one of said transmission lines, a plurality of groups of registering relays located at said control point, a plurality of groups of means including groups of conducting paths for rendering each relay in said groups of registering relays operatively responsive to the application of a respective one of said potentials to a respective one of said transmission lines, and means operative upon the generation of simultaneous or overlapping signals from a plurality of said subscriber stations for ensuring the operation of a preferred one of said relays in each of said relay groups thereby to preclude the simultaneous operation of more than one combination of said last named relays, whereby the operation of a combination of one of said relays from each of said groups of registering relays may be translated, in accordance with a preselected code, into a digit combination indicative of the originating station.

12. Apparatus in accordance with claim 11 wherein said groups of means further include a diode in series relation with each of said conducting paths, each of said diodes having a voltage breakdown value corresponding to a respective one of said potentials.

13. Apparatus in accordance with claim 11 further including means operative after the operation of an identifying group of said registering relays for automatically terminating the generation of the corresponding alarm signal at the originating one of said subscriber stations.

14. In a signal reporting system, in combination, a plurality of signal stations each including means responsive to a respective preselected condition for generating respective oscillatory signals, a first remote station, transmission means for applying each of said signals to said remote stations, a first plurality of combinations of current responsive means at said first remote station each of said combinations being operatively responsive to an oscillatory signal from a respective one of said stations, a second remote station, a plurality of sources of direct potential each having a unique voltage magnitude, a plurality of conducting paths connecting said first and second remote stations, means responsive to the operation of one of said combinations of current responsive means for applying a respective one of said potentials to each of said conducting paths in accordance with a preselected code, a plurality of groups of current responsive means at said second remote stations, one of said last named means in each of said groups being operatively responsive to the application of a respective one of said potentials from a respective one of said conducting paths, whereby the operation of one of said last named means in each of said groups may be translated in accordance with said code into a digit combination indicative of the originating one of said signal stations.

References Cited by the Examiner

UNITED STATES PATENTS

| | | | |
|---|---|---|---|
| 2,559,622 | 7/1951 | Hildyard | 340—172 |
| 2,568,342 | 9/1951 | Koehler et al. | 179—2 |
| 2,816,218 | 12/1957 | Rees et al. | 340—163 |
| 2,911,474 | 11/1959 | Weinberg et al. | 179—5 |
| 2,923,772 | 2/1960 | Wadsworth | 179—5 |

ROBERT L. GRIFFIN, *Primary Examiner.*

T. G. KEOUGH, S. J. GLASSMAN, *Assistant Examiners.*